Sept. 3, 1940.   B. G. JOHNSON   2,213,766
HOIST CONSTRUCTION
Original Filed Nov. 5, 1937

Inventor:
Bernard G Johnson
by James R. McKnight
his Attorney.

Patented Sept. 3, 1940

2,213,766

UNITED STATES PATENT OFFICE 2,213,766

HOIST CONSTRUCTION

Bernard G. Johnson, Brookfield, Ill.

Original application November 5, 1937, Serial No. 172,978, now Patent No. 2,161,578, dated June 6, 1939. Divided and this application May 25, 1939, Serial No. 275,577

1 Claim. (Cl. 254—139.1)

This invention relates particularly to hoist construction.

This application is a divisional application of application Serial No. 172,978 filed on November 5, 1937, for a Die truck on which Patent 2,161,578 issued on June 6, 1939.

Among the objects of my invention is to create a die truck having an overhead hoist construction for separating, rotating and assembling heavy leader pin die sets, to provide a hoist of simple, light and portable construction, yet with sufficient rigidity and strength to move heavy die sets, and such other objects, advantages and capabilities as will later more fully appear and which are inherently possessed by my invention.

While I have shown in the accompanying drawing a preferred embodiment of my invention, yet I wish it understood that the same is susceptible of modification and change without departing from the spirit of my invention.

Figure 1:
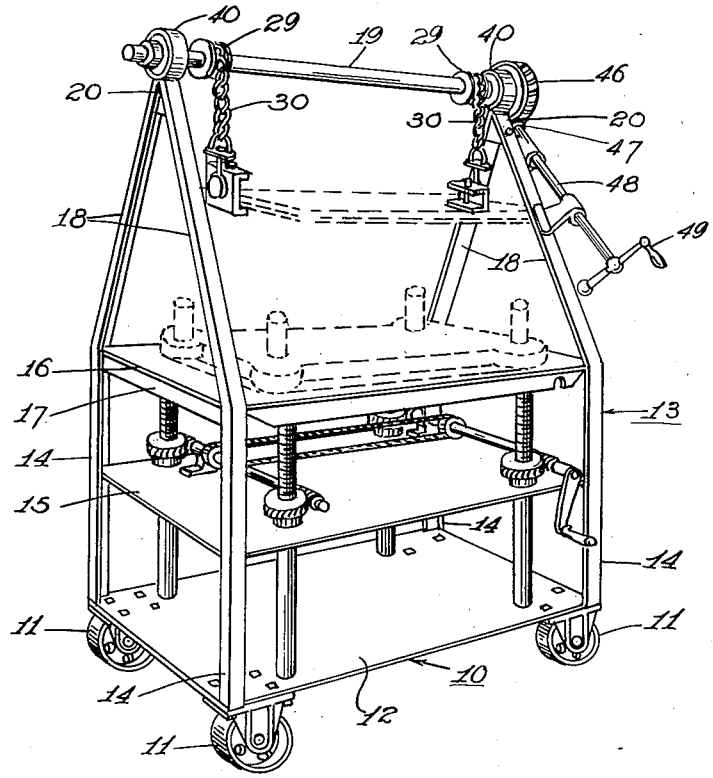
Figure 2:
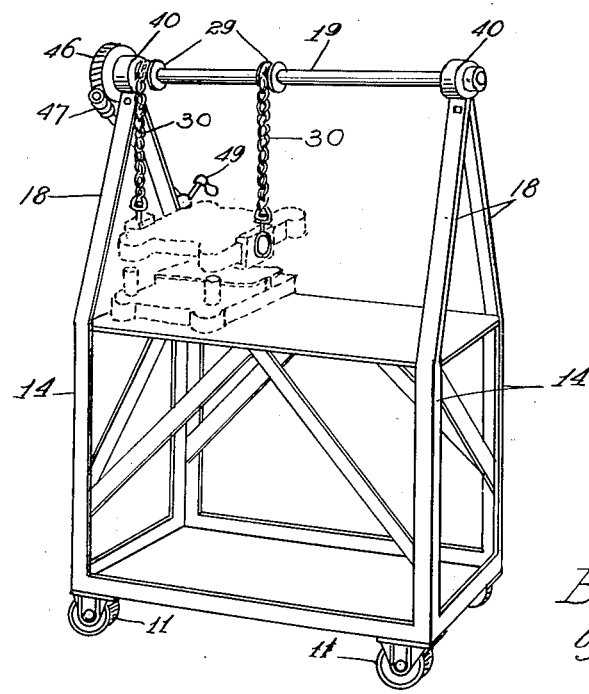

Referring to the drawing, Figs. 1 and 2 are perspective views of preferred embodiments of my invention.

The embodiment selected to illustrate my invention comprises a truck 10 having a plurality of casters 11, preferably four, attached by suitable means such as rivets or electric welding adjacent each of the four corners of a base 12. A frame 13 preferably consists of a plurality of upright portions 14, the lower ends of which are attached by electric welding or the like to the upper face of the base 12 adjacent each of the corners thereof. The upright members 14 extend upwardly beyond an intermediate table 15 to substantially the normal level of a top table 16. A cross member 17 extends between each of the upright portions 14 at the ends of the truck as shown in Fig. 1. Each pair of members 14 on opposite ends of the truck continues upwardly and inwardly as converging portions 18 meeting at their top portions 20 to form a support for bearing 40. An overhead shaft 19 extends between and is supported by oppositely disposed bearings 40.

A pair of spools 29 are slidably mounted on overhead shaft 19. To each of said spools 29 is attached at its inner end a chain, cable or length of suitable material 30.

Adjacent the outer side of one of the bearings 40 a worm wheel 46 is suitably attached to the overhead shaft 19. A worm gear 47 is positioned to actuate said worm wheel 46 upon movement of shaft 48 by operation of handle 49.

Cross members 17 are adapted to receive parallel bars upon which the user may place a desired object, such as a punch holder for examination and work.

Having thus described my invention, I claim:

In a portable construction a substantially rectangular base, a frame having two pairs of spaced vertically extending upright portions, the lower ends of said upright portions permanently attached to the upper face of said base adjacent each of the corners thereof, a pair of cross members, each cross member extending longitudinally between a pair of said upright portions and attached to the upper ends of said upright portions, two pairs of converging portions integral with said upright portions and beginning with said cross members, each pair of said converging portions above the shorter sides of the rectangular base extending upwardly and inwardly above said cross members and meeting at their upper ends to form thereabove a pair of oppositely spaced supports, a pair of bearings each supported on one of said oppositely spaced supports, an overhead shaft extending between and rotatably supported on said bearings, a pair of spools slidably mounted on said shaft, a pair of lengths, each one of said lengths attached at its inner end to one of said spools, a worm wheel attached to said shaft adjacent the outer side of one of said bearings, a rod rotatably attached to an adjacent converging portion and extending downwardly to substantially the lower end of said converging portion, a manually operable handle attached to the lower end of said rod, a worm gear positioned on the upper end of said rod for contacting said worm wheel and adapted upon manual operation of said rod by said handle to rotate said shaft and in turn to wind or unwind said spool on said shaft to raise or lower said lengths.

BERNARD G. JOHNSON.